United States Patent [19]
Bradbury

[11] Patent Number: 5,212,628
[45] Date of Patent: May 18, 1993

[54] MODULAR PORTABLE WORK STATION HAVING A MOVABLE SUPPORT TRAY

[75] Inventor: George M. Bradbury, Bonsall, Calif.

[73] Assignee: The I.D.E.A. Corporation, Las Cruces, N. Mex.

[21] Appl. No.: 822,065

[22] Filed: Jan. 17, 1992

[51] Int. Cl.⁵ .............................................. H05K 7/16
[52] U.S. Cl. .................................... 361/395; 361/380; 400/88
[58] Field of Search ................... 364/708; 400/88, 691; 361/380, 390, 391, 395, 399

[56] References Cited

U.S. PATENT DOCUMENTS

| | | | |
|---|---|---|---|
| 4,736,332 | 4/1988 | Crease | 364/708 |
| 4,790,431 | 12/1988 | Reel et al. | 400/691 X |
| 4,803,652 | 2/1989 | Maeser et al. | 364/708 |
| 4,837,590 | 6/1989 | Sprague | 400/691 X |
| 4,839,837 | 6/1989 | Chang | 364/708 |
| 4,851,812 | 7/1989 | Holmberg | 364/708 X |
| 4,929,948 | 5/1990 | Holmberg | 364/708 X |

FOREIGN PATENT DOCUMENTS

91/04461  4/1991  World Int. Prop. O. .......... 364/708

Primary Examiner—Leo P. Picard
Assistant Examiner—Michael W. Phillips
Attorney, Agent, or Firm—Hawes & Fischer

[57] ABSTRACT

A versatile, compact portable work station comprising a computer, a printer, and other peripherals, including but not limited to a digital camera, an optical scanner, a cellular telephone, a modem, and the like, that are efficiently interconnected with one another and stored within a carrying case. A computer tray supports the computer in spaced alignment above the printer. The computer tray is adapted to be advanced relative to the printer to permit easy access to both the printer and computer. The computer, printer and other peripherals are powered from a lead-acid battery that is stored within the carrying case. Also included in the case is a main control panel having a plurality of switches that are selectively operated to respectively connect the battery to one or more of the computer and peripherals, such that the work station is controlled completely from the carrying case.

17 Claims, 8 Drawing Sheets

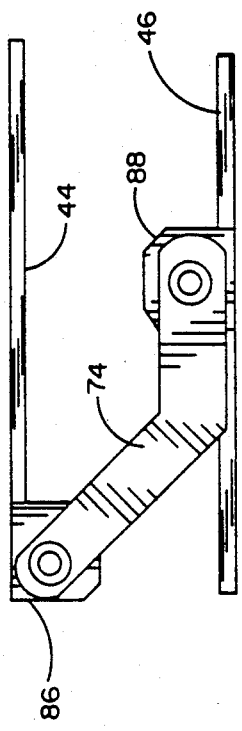
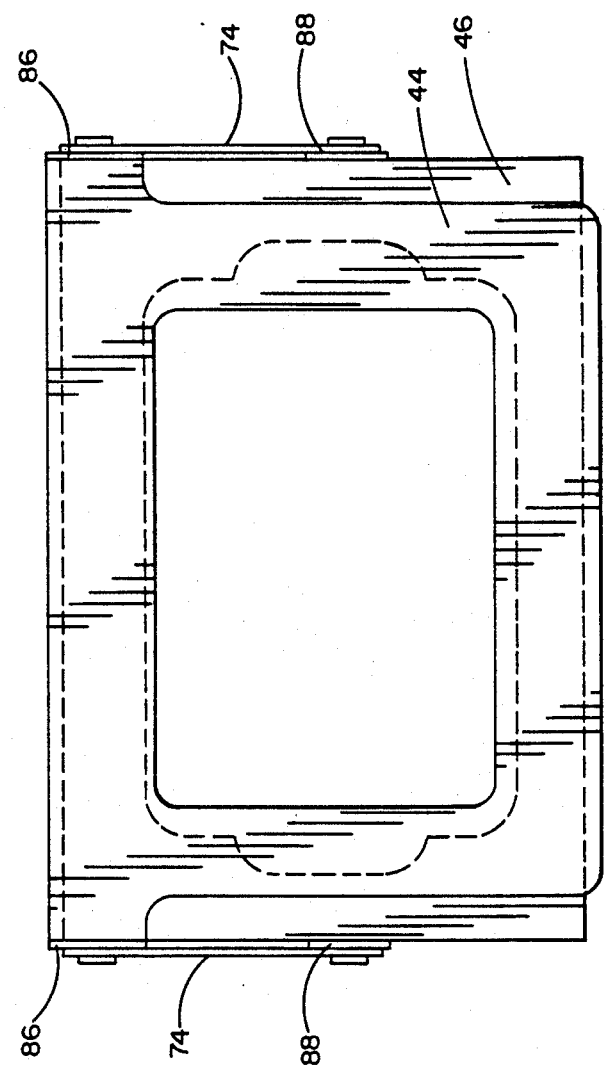
FIG. 7
FIG. 8

MODULAR PORTABLE WORK STATION HAVING A MOVABLE SUPPORT TRAY

BACKGROUND OF THE INVENTION

1. Field of the Invention

This invention relates to a modular portable work station comprising a computer and a plurality of computer peripherals that are interconnected with one another and efficiently packaged for storage within and control from a carrying case.

2. Background Art

Portable offices have been commercially available for several years. More particularly, it is known to package a personal computer and various computer peripherals within a carrying case to facilitate the transport and storage of a compact work station. However, the versatility of the portable office within such carrying case has been undesirably limited. That is to say, and because of the space constraints that are characteristic of the carrying case, the user is often required to remove either the computer or the printer from the case before access can be gained to each. In other cases, a computer printer and other standard peripherals can not be easily packaged within and controlled from the same carrying case, making it necessary for the operator to have access to an external printer and/or the other computer peripherals. The foregoing shortcoming detracts from the advantage of a portable office, particularly when the work space is very small, such as that which would be available on a plane or a train.

The versatility of some conventional portable offices is also limited because of the lack of a fully integrated and self-contained operation. That is, the computer and all of the peripherals are not always controllable from the carrying case. More particularly, external sources of power, telephone receptacles, and the like, are sometimes necessary before the office can be made fully operational. Moreover, some portable offices do not permit a user to selectively operate the computer and particular ones of the peripherals from a readily accessible and easy to operate master control panel.

It would therefore be desirable to have available a compact, portable office or work station including a personal computer, printer and other conventional peripherals that are efficiently packaged and transported within a carrying case. It would also be desirable that the computer and peripherals be controlled from the carrying case and selectively energized, one or more at a time, at a readily accessible master control panel. It is still further desirable for the computer and printer to be used without having to remove either from the carrying case.

One example of a portable computer and printer that are operated within a carrying case is available by referring to U.S. Pat. No. 4,837,590 issued June 6, 1989.

SUMMARY OF THE INVENTION

In general terms, a compact portable work station is disclosed comprising a personal computer, a printer and other conventional peripherals that are all interconnected with one another and efficiently packaged within and operational from an impact resistant carrying case. Besides the printer, the computer may be interfaced with one or more of an optical scanner, a cellular telephone, a digital camera and a modem to permit facsimile and data transmission. A shroud extends across the front of the carrying case and a lead acid battery is located at one side of the shroud and mechanically connected thereto. The battery is seated upon the cellular telephone, and a data interface (to permit facsimile and data transmission via the cellular telephone) is seated upon the battery to create a vertical stack of peripherals within the shroud. Located at the opposite side of the shroud is the modem. Seated upon the modem is the main circuit board. The circuit board is electrically interconnected with a main control panel at the top of the shroud. The main control panel includes a plurality of readily available switches that are manually operated to selectively energize the computer and one or more of the peripherals.

Located at the rear and to one side of the carrying case is a compartment within which to receive the digital camera. A pair of retaining straps surround the camera to hold it in place. Located at the rear and to the opposite side of the carrying case are the computer and printer supported in vertical alignment with one another. A printer tray is attached to the bottom of the carrying case, and the printer is carrying thereon. Spaced above the printer tray is a computer tray on which the computer is carried. The printer tray and computer tray are interconnected with one another by a pair of arms. Opposite ends of the arms are pivotally connected to respective brackets at each of the printer and computer trays. Thus, the computer tray can be moved forwardly of the printer tray to permit easy access to both the computer and printer without having to remove either from the case.

BRIEF DESCRIPTION OF THE DRAWINGS

FIG. 7 is a side view to illustrate the positions of the computer tray and printer tray when the carrying case is closed;

FIG. 8 is a top view of the computer and printer trays of FIG. 7; and

DETAILED DESCRIPTION

Figure 1:
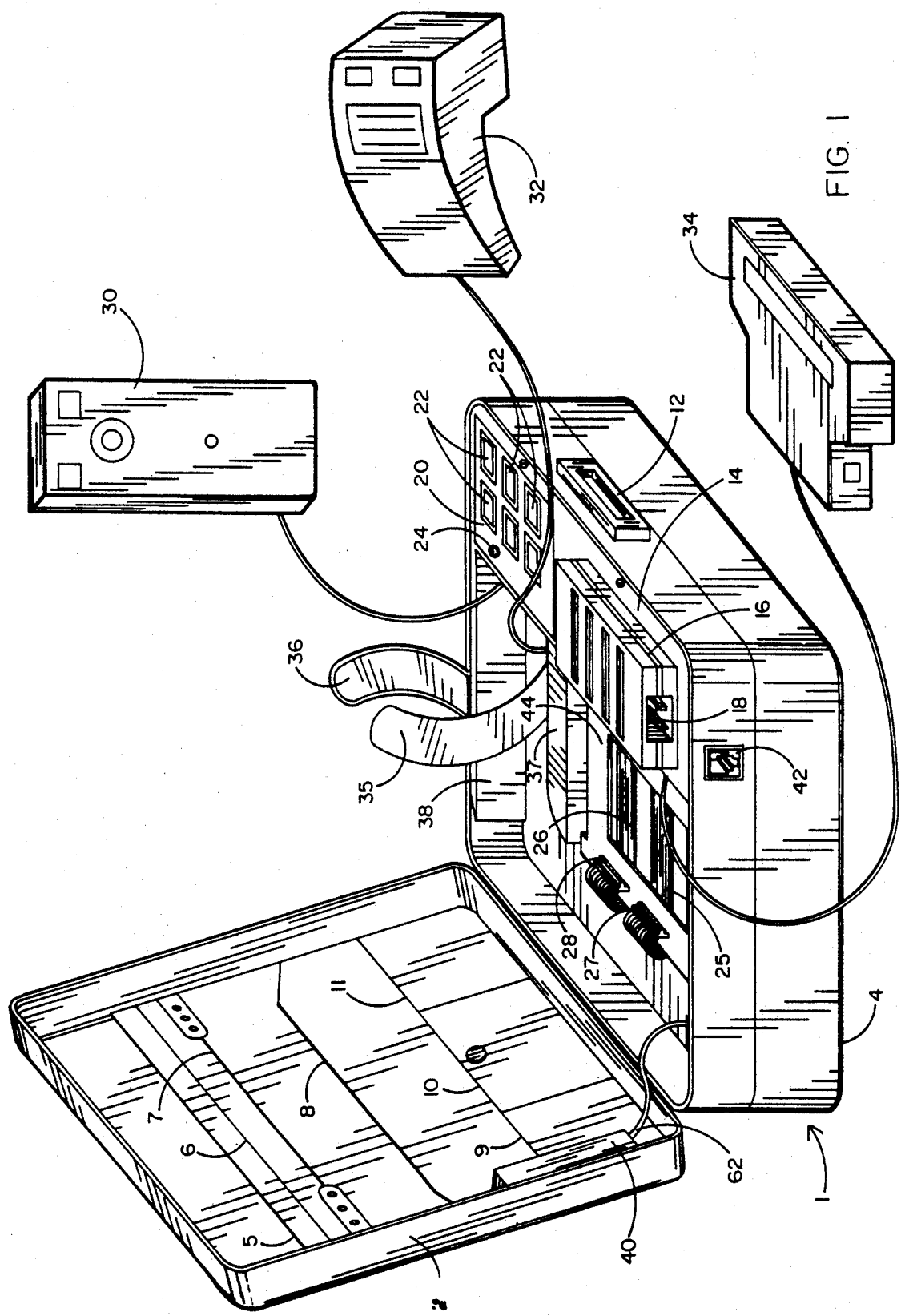
FIG. 1 is a perspective view of the modular portable work station of the present invention with the carrying case opened and the computer and printer removed therefrom.

The modular portable work station which forms the present invention is now described while referring initially to FIG. 1 of the drawings, where a carrying case 1 is illustrated for conveniently transporting and storing the work station. The carrying case 1 is manufactured from an impact resistant material (e.g. ABS plastic), and includes a cover 2 that is hingedly connected to a body 4 and adapted to rotate between opened and closed positions relative to said body. Located inside the cover 2 is a plurality of pockets and flaps 5-11 in which to conveniently store and carry a variety of common business and stationery articles. A handle 1 is coupled to the body 4 of carrying case 1 to permit the case 1 to be transported when cover 2 is closed upon body 4.

A shroud or enclosure 14 extends across &he front of the body 4 of carrying case 1. As will be explained hereinafter, the shroud 14 surrounds a battery and a plurality of computer peripheral devices, one or more of which may be used during operation of the work station. Located on top of and at one side of shroud 14 is a battery charger 16 which may be removed from body 4. The battery charger 16 includes a receptacle 18 which is adapted to receive a power cord extending from an available 110 volt AC source of power. Located at the top of and at the opposite side of shroud 14 so as to be readily accessible to the user of the work station is a main control panel 20. The main control panel 20 includes a plurality of function switches (designated generally by &he reference numeral 22) and a light emitting diode 24 to indicate that power is being supplied from a source thereof to the electrical components of the work station. The purpose and operation of function control switches 2 will be described in greater detail when referring to FIG. 9.

A pair of ribbon cables 25 and 26 are located within the body 4 of carrying case to connect a compact portable computer (designated 100 in FIGS. 3 and 4) to a plurality of computer peripherals that are located within case 1. That is, first ends of ribbon cables 25 and 26 terminate at conventional electrical connectors 27 and 28 which are to be detachably connected to the computer 100. The opposite ends of cables 25 and 26 are connected to commercially available peripheral devices that are adapted to interface with computer 100. By way of example, the peripheral devices to be carried within the body 4 of case 1 include a digital camera 30, a cellular telephone having an associated hand set 32 and an optical scanner 34. However, the work station is not limited to peripheral devices 30, 32 and 34, such that these and/or other conventional peripherals may be carried in case 1 and interfaced with computer 100.

To this end, a pair of retaining straps 35 and 36 extend from the bottom of body 4 to surround and retain the digital camera 30. The straps 35 and 36 may contain complementary hook and loop material (not shown) by which said straps can be fastened to one another to hold camera 30 in place within the carrying case 1. In addition, padded (e.g. foam) side cushions 37 and 38 are secured to the bottom of body 4 between which the digital camera 30 is received and protected against shock.

What is more, an antenna 40 is conveniently retained at the underside of the cover 2 of case 1 and interconnected with the cellular telephone (designated 54 in FIG. 2) to enable suitable telephone and modem (e.g. facsimile) communications. An auxiliary telephone input receptacle 42 is located in the side of body 4. Receptacle 42 is adapted to receive an external telephone jack when it is not necessary or desirable to use the cellular telephone of carrying case 1 for modem or voice transmission.

Figure 3:
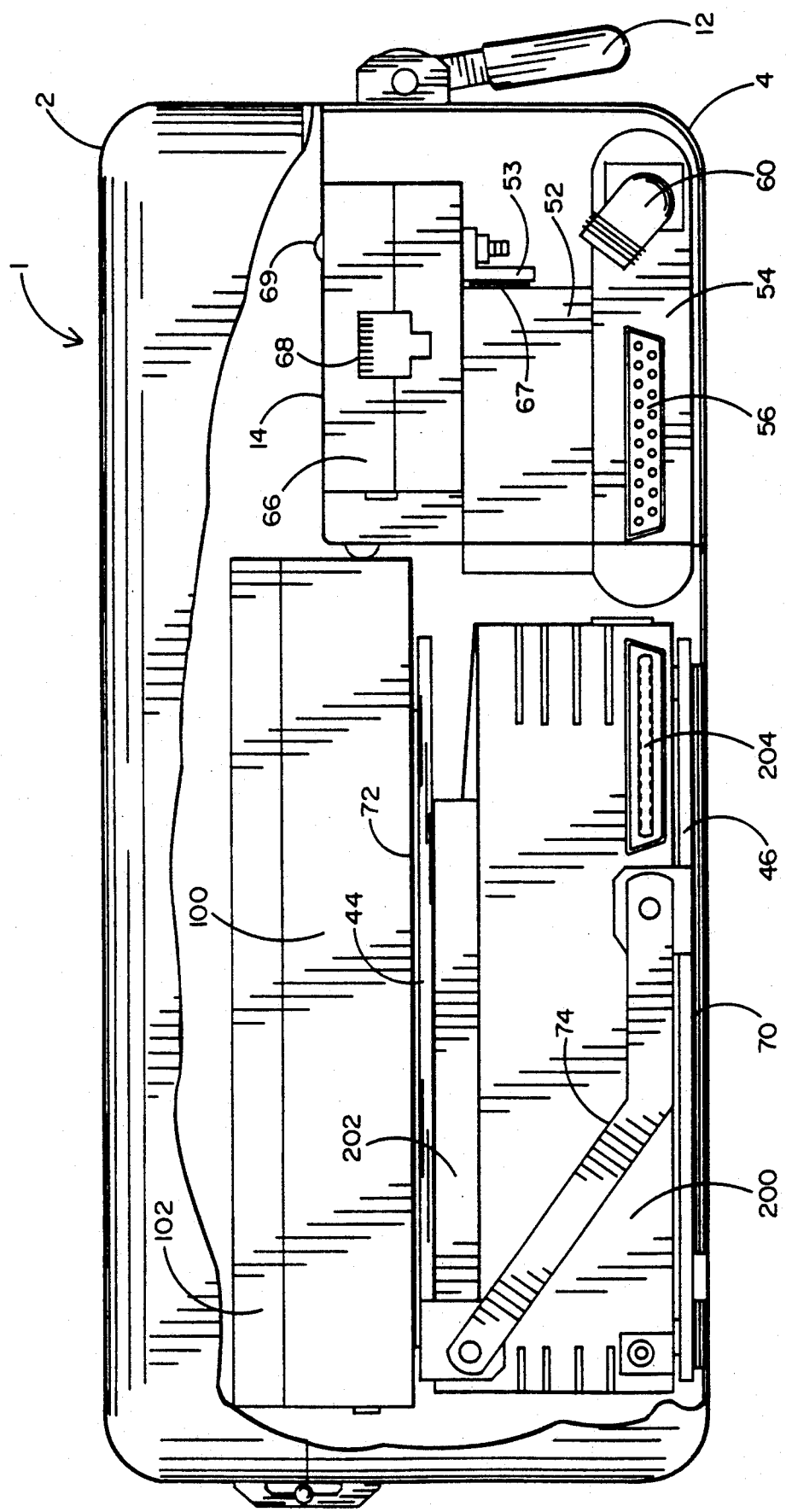
FIG. 3 is a side view of the carrying case partially broken away.
Figure 4:
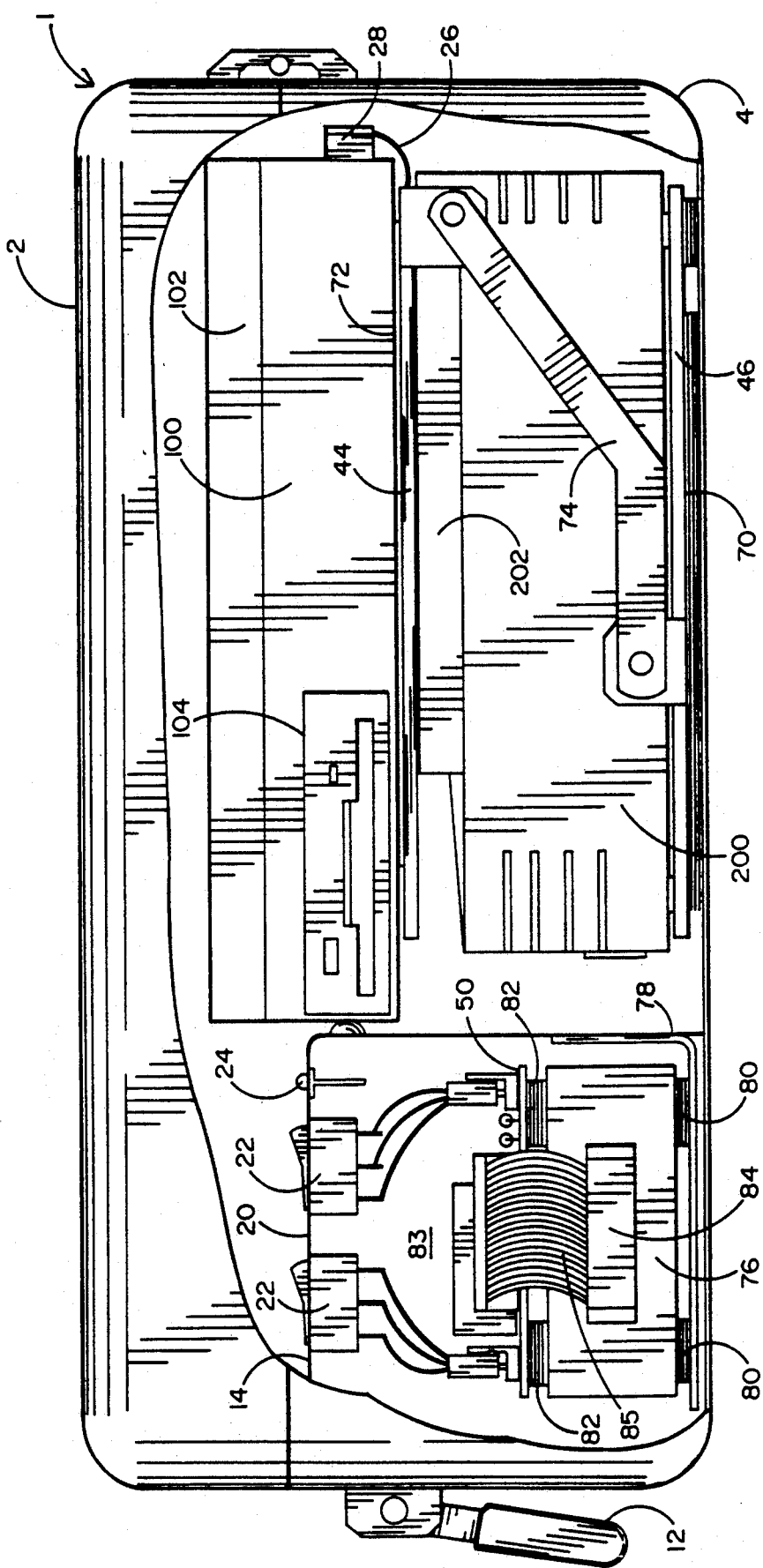
FIG. 4 is an opposite side view of the carrying case partially broken away.
Figure 5:
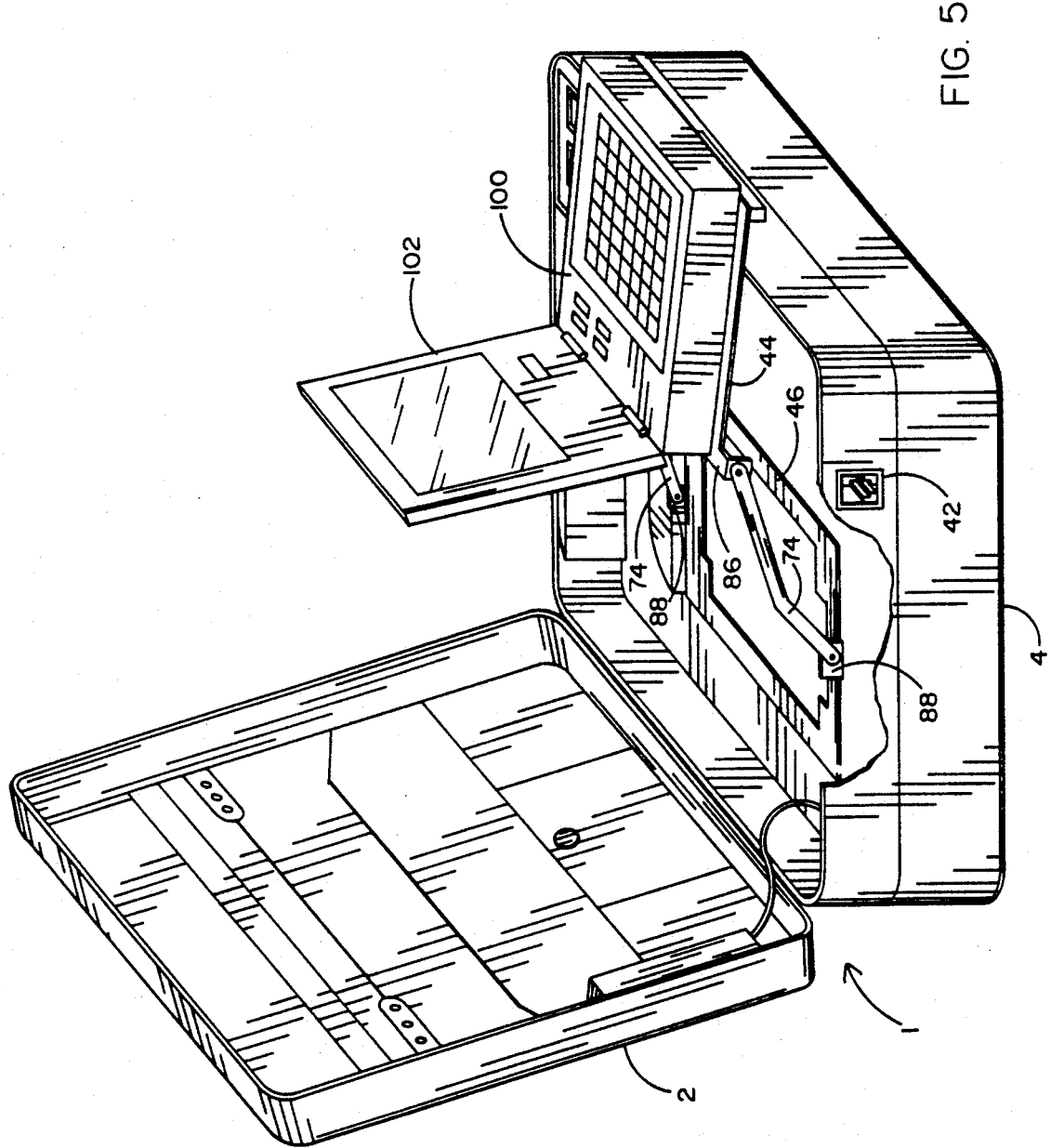
FIG. 5 shows the carrying case opened with the computer tray advanced forwardly of the printer tray.
Figure 6:
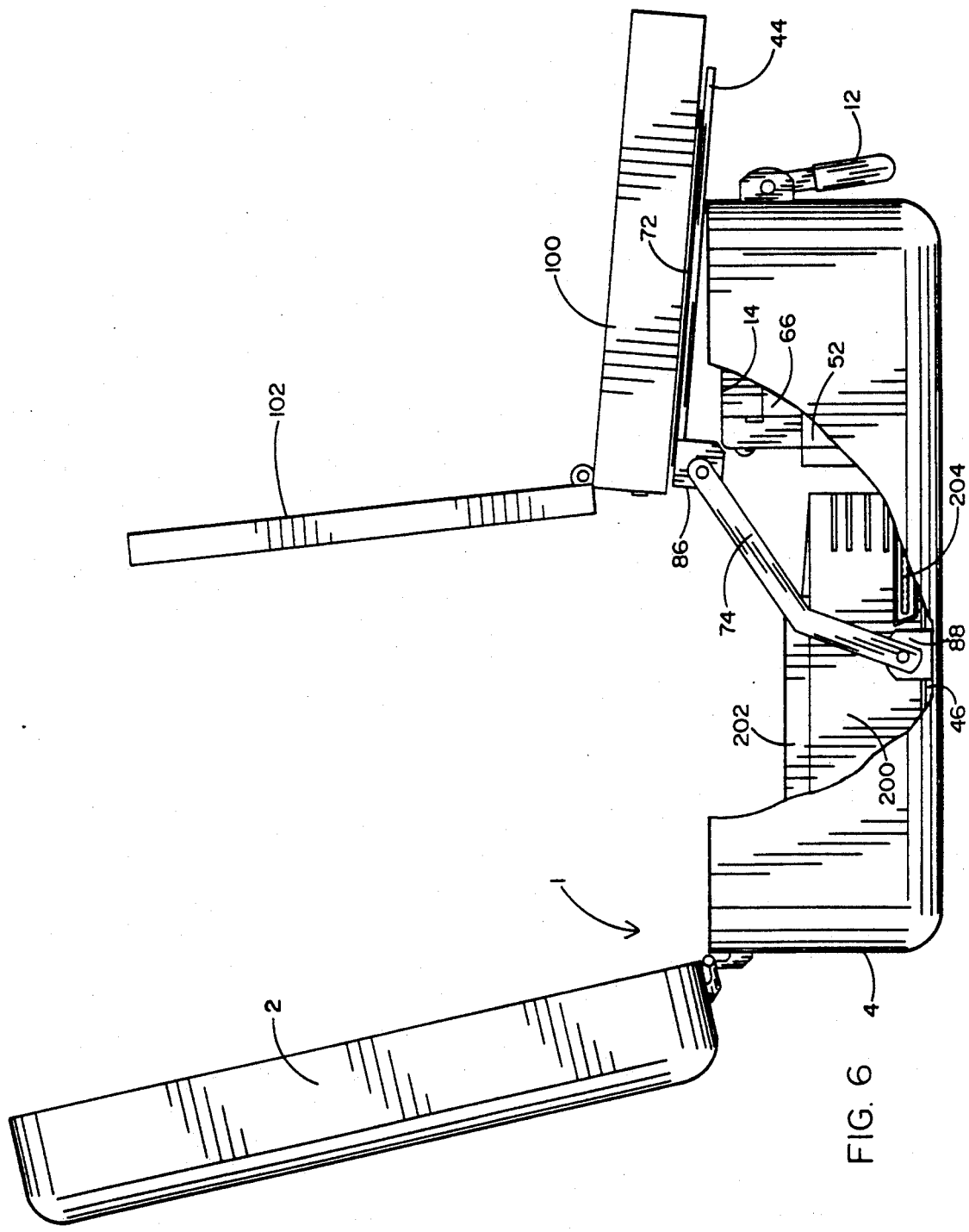
FIG. 6 is a side view of the carrying case of FIG. 5 partially broken away showing the positions of the computer and printer relative to one another.

As an important advantage of the present invention, computer and printer trays 44 and 46 (best illustrated in FIGS. 5-8) are positioned in spaced parallel alignment with one another at the rear of the body 4 of carrying case 1. As is also shown in FIGS. 3 and 4, the computer tray 44 supports the computer 100 and the printer tray 46 supports a printer 200. However, and as will soon be disclosed, the computer tray 44 is interconnected with and movable relative to the printer tray 46 to facilitate easy access to and use of the computer 100 on tray 44 and the printer 200 on tray 46.

Figure 2:
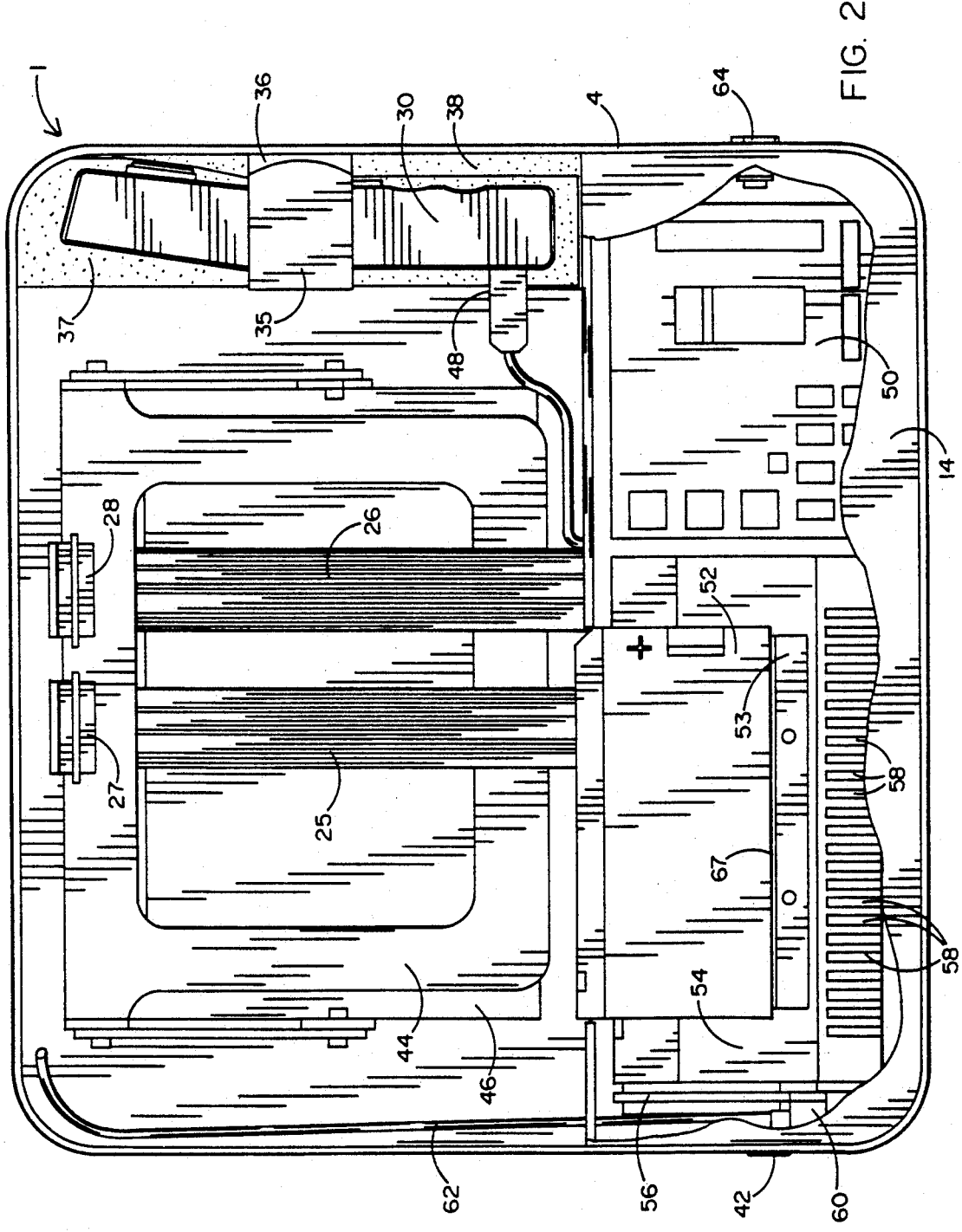
FIG. 2 is a top view of the carrying case of FIG. 1.

FIG. 2 of the drawings shows the body 4 of carrying case 1 with the digital camera 30 secured in the stowed position by retaining straps 35 and 36. Camera 30 is connected by an associated connector 48 to the computer via circuitry contained on a main circuit board 50. The main circuit board 50 is located below the shroud 14 at the front of body 4 and contains the switching and power distribution electronics for controlling the operation of the portable work station in response to the activation of function switches 22 on main control panel 20 (of FIG. 1). The handset 32 and optical scanner 34 (of FIG. 1) may be stowed within the pockets 5-11 of cover 2 or wherever space is available within the body 4 of case 1.

Also located below the shroud 14 of body 4 in case 1 is a conventional 12 volt lead acid battery 52. The battery 52 is mechanically connected to the top of shroud 14 by means of an L-shaped bracket 53. To promote an efficient and compact packaging of the work station, the battery 52 rests upon the cellular telephone 54 which is also disposed below shroud 14. The cellular telephone 54 includes the usual power connector 56 (best shown in FIG. 3) and a series of cooling vents 58. Cellular telephone 54 also includes an antenna connector 60 (also best shown in FIG. 3) which communicates with the antenna (designated 40 in FIG. 1) at the underside of the cover 2 by way of an antenna cable 62. A DC input receptacle 64 is located in the side of body 4 (opposite the side in which telephone receptacle 42 is located) to receive a 14.7 volt DC input signal from the battery charger (designated 16 in FIG. 1) or any other suitable voltage source.

In FIG. 2, the computer and printer trays 44 and 46 are shown arranged in spaced parallel alignment with one another at the rear of the body 4 of carrying case 1 with the computer and printer removed therefrom. Therefore, respective electrical connectors 27 and 28 of ribbon cables 25 and 26 ar shown disconnected from the computer. However, in FIGS. 3 and 4, the computer 100 and printer 200 are shown in place on computer and printer trays 44 and 46 with ribbon cables 25 and 26 connected to said computer by means of connectors 27 and 28.

The space conserving, vertically stacked alignments of the computer 100 and associated peripheral devices are now described while referring concurrently to FIGS. 3 and 4 of the drawings. As is best shown in FIG. 3, a first vertical stack of peripheral devices is shown located at the front and to one side of carrying case 1. This first stack of devices includes the cellular telephone 54 which is positioned at the bottom of body 4. Seated upon cellular telephone 54 is the battery 52, and seated upon the battery 52 is a data interface 66. The data interface 66 is connected between the cellular telephone 54 and the modem (designated 76 in FIG. 4) to permit facsimile and data transmission. Data interface 66 includes receptacle 68 for receiving the jack from the hand set (designated 32 in FIG. 1).

One leg of L-shaped bracket 53 is attached to battery 52 by means of complementary strips of hook and loop material 67 (commercially known as VELCRO), and the second leg of bracket 53 is mated to the top of shroud 14 by means of a pair of screws 69 (only one of which is shown) that extend through the data connector 66 and the shroud 14. Thus, the battery 52 is retained in place within shroud 14 by bracket 53 and the screws 69 which penetrate said shroud. Moreover, the second leg of bracket 53 supports the data interface 66 between the shroud 14 and battery 52, whereby to preserve the stacked alignment of cellular telephone 54, battery 52 and data interface 66, all wedged together within shroud 14. In this manner, additional space will be advantageously available above the shroud 14 at which to store other peripheral devices, such as the battery charger (not shown). It is to be understood that the order in which the cellular telephone 54, battery 52 and data interface 66 are stacked relative to one another need not be exactly as illustrated. However, as a space conserving advantage of the present invention, these peripheral devices are located within the shroud 14, since it is not usually necessary that said devices be accessible for use in or removal from the carrying case during normal operation of the work station.

The computer 100 and printer 200 are spaced one above the other at the rear of carrying case 1. The printer tray 46 is detachably secured to the bottom of base 4 by means of opposing complementary strips of hook and loop fastener material (e.g. VELCRO) 70 attached to the bottom of tray 46 and the top of base 4. For optimum storage efficiency, the printer 200 rests upon the printer tray 46, and, with the cover 2 of carrying case 1 in the closed position as shown in FIGS. 3 and 4, the lid 202 of printer 200 is correspondingly closed atop said printer. Printer 200 also includes the usual data connector 204 at one side thereof to be interfaced with a data cable (not shown) from the computer 100.

With the cover 2 of carrying case 1 closed, the computer tray 44 is arranged in spaced parallel alignment above the printer tray 46. The computer 100 is detachably connected to the computer tray 44 by means of opposing complementary strips of hook and loop fastener material (e.g. VELCRO) 72 attached to the top of tray 44 and the bottom of computer 100. For optimum storage efficiency, computer 100 rests upon the computer tray 44 with the lid 102 thereof closed atop the computer keyboard. The computer tray 44 is interconnected with the printer tray 46 by a pair of arms 74 (only one of which is shown in FIGS. 3 and 4). However, as will be described in greater detail when referring to FIGS. 5 and 6, the computer tray 44 may be advanced forwardly of printer tray 46 and out of body 4 when the cover 2 of carrying case 1 is opened by rotating cover 2 upwardly and away from said body.

FIG. 4 of the drawings shows the aforementioned vertical alignment of computer 100 and printer 200 on the respective computer and printer trays 44 and 46 at the rear of the body 4 of carrying case 1 with the cover 2 thereof closed. A conventional floppy disk drive 104 is located at one side of computer 100. Also shown in FIG. 4 is the vertical alignment of the modem 76 (to permit facsimile and data transmission) and the main circuit board 50 within the shroud 14 at the front and to ore side of the body 4 of carrying case 1 opposite the side at which the cellular telephone 54, battery 52 and data interface 66 are stacked (best shown in FIG. 3). More particularly, one leg of an L-shaped plate 78 is affixed (e.g. glued) to a side of shroud 14. The second leg of plate 78 is located within the shroud 14 and spaced above the bottom of body 4. The modem 76 is detachably connected to the second leg of plate 78 by means of opposing strips of hook and loop fastener material (e.g. VELCRO) 80 attached to the top of plate 78 and bottom of modem 76. Similarly, the main circuit board 50 is detachably connected to the modem 76 by means of opposing strips of hook and loop material (e.g. VELCRO) 82 attached to the top of modem 76 and the bottom of circuit board 50.

The main circuit board 50 and modem 76 are stacked one atop the other at an out-of-the-way location within shroud 14 so as to conserve additional space within the carrying case 1. However, the switches 22 and light emitting diode 24 on main control panel 20 are readily available to the operator of the work station. Likewise, the stacked alignment of circuit board 50 and modem 76 facilitates the electrical connection between switches 22 and circuit board 50 as well as circuit board 50 and the modem 76 by way of a conventional header connector 83, ribbon cable 85 and data connector 84.

Referring concurrently to FIGS. 5-8 of the drawings, details regarding the movement of computer tray 44 relative to printer tray 46 are explained for advancing the computer 100 carried on tray 44 out of carrying case 1. As earlier indicated, the computer tray 44 is connected to printer tray 46 by a pair of parallel aligned arms 74. Each of the arms 74 is pivotally connected at first ends there to respective end brackets 86 which project from opposite sides of the computer tray 44. Each of the arms 74 is also pivotally connected at the opposite ends thereof to respective end brackets 88 which project from opposite sides of the printer tray 46. By way of example, a rivet or pin may be used to pivotally connect the arms 74 between brackets 86 and 88.

Accordingly, the computer tray 44 which is supported above the printer tray 46 by means of arms 74 may be lifted vertically and advanced horizontally relative to printer tray), 46 when the cover 2 of carrying case is opened. That is to say, when the cover 2 of case 1 is closed atop body 4, the computer tray 44 will be in closely spaced, face-to-face alignment with printer tray 46 (best shown in FIGS. 7 and 8). Thus, to maximize space conservation, the computer 100 and printer 200 will be positioned one over the other at the rear of case 1. However, and by virtue of the pivotal interconnection of arms 74 between trays 44 and 46, when the cover 2 of carrying case 1 is opened relative to body 4, the computer tray 44 may be first raised upwardly from and then moved forwardly of printer tray 46 (best shown in FIGS. 5 and 6) to clear the shroud 14 and facilitate access to the computer 100 and the printer 200 thereunder. More particularly, the arms 34 are adapted to rotate at the end brackets 86 and 88 to permit the computer tray 44 to be simultaneously raised or lowered and moved forward or backwards from retracted to advanced positions over the body 4 of carrying case 1 so that the computer 100 will be correspondingly moved into and out of vertical alignment with the printer 200.

Figure 9:
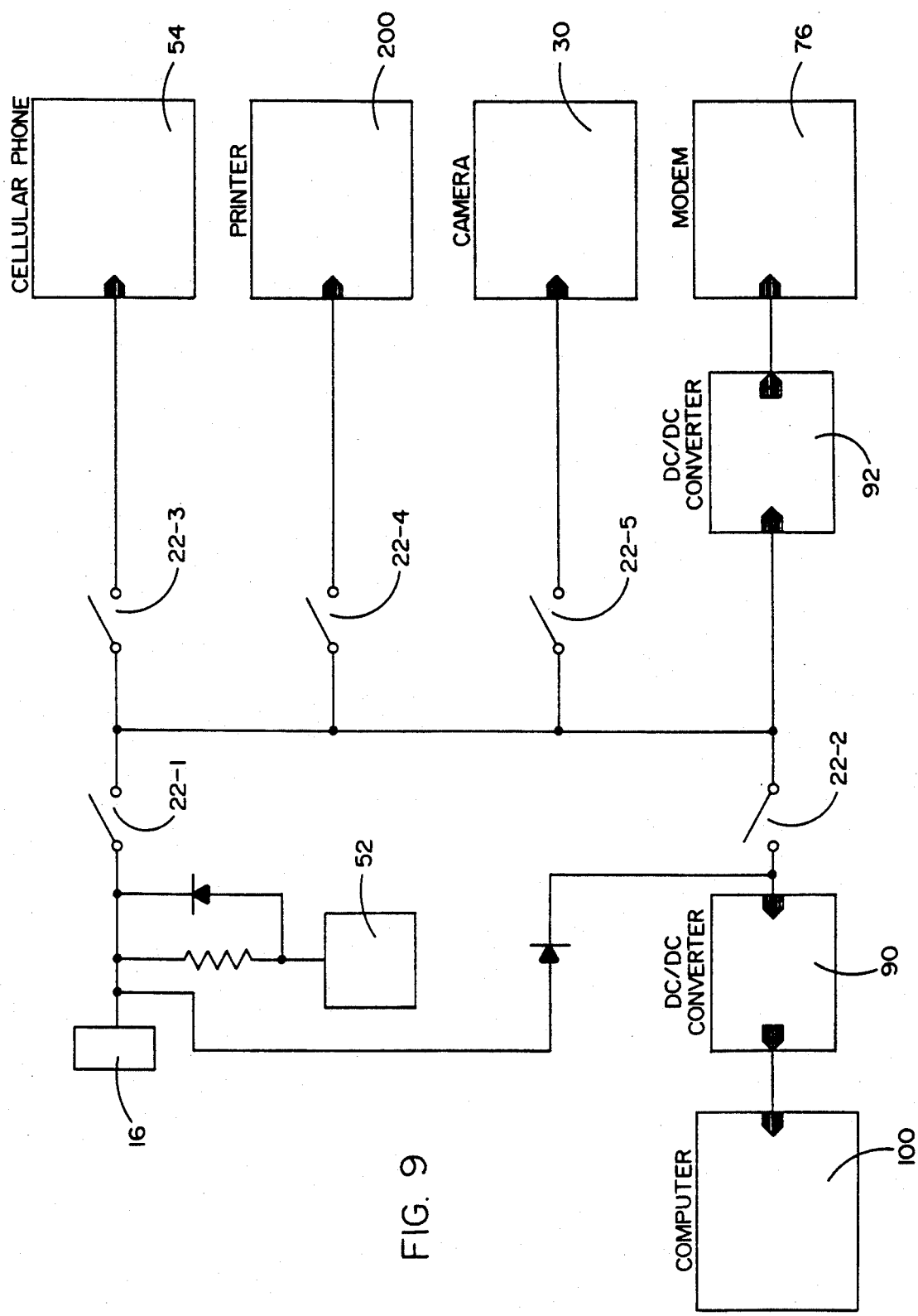
FIG. 9 is a block diagram to illustrate the power distribution between a power source and the computer and peripherals which form the work station of this invention.

FIG. 9 of the drawings shows a power distribution diagram and the interconnection of the function switches 22 at the main control panel 20 (of FIG. 1) between the power sources (i.e. battery charger 16 and battery 52) and the computer 100 and peripherals. With a main power switch 22-1 opened, power will be removed from the peripherals. However, power will still be supplied from the battery charger 16 to computer 100 via a DC-DC converter 90. That is, a 12 volt DC signal is applied from battery charger 16 to an input terminal of DC-DC converter 90, and an 18 volt DC signal is applied from an output terminal of converter 90 to the computer 100. With the main power switch 22-1 and a computer control switch 22-2 simultaneously closed, power can also be supplied to the computer 100 from lead acid battery 52.

With the main power control switch 22-1 closed, power will be supplied to the modem 76 via a DC-DC converter 92. That is, a 12 volt DC signal is applied to an input terminal of DC-DC converter 92, and a 9 volt DC signal is applied from an output terminal of converter 92 to modem 76. Likewise, with power control switch 22-1 closed, one or more of the cellular phone 54, printer 200 and digital camera 30 may be energized by selectively closing corresponding function switches 22 3, 22-4 and 22-5. An additional switch (not shown in FIG. 9) is also provided on control panel 20 to selectively connect the serial port of computer 100 to either the camera 30 or modem 76 to permit data to be transferred therebetween.

By virtue of the disclosed invention, a compact portable work station including a computer, printer and other peripherals may be efficiently packaged within and controlled entirely from carrying case. Being that the computer and peripheral devices are conventional, the details thereof have been omitted. Nevertheless, and for purposes of illustration only, the computer 100 may be a commercially available 20MHz 386SX notebook personal computer with a 40MB hard drive. The digital camera 30 is available from Dycam Corporation. The cellular telephone 54 is available from Motorola Corporation. The printer 200 may be a Bubble Jet Printer available from Canon Corporation. Moreover, the carrying case 1 is a hard shell case available from Samsonite Corporation.

It will be apparent that while a preferred embodiment of the invention has been shown and described, various modifications and changes may be made without departing from the true spirit and scope of the invention.

Having thus set forth the preferred embodiment, what is claimed is:

1. A portable work station including a carrying case and at least a computer and printer transported within the carrying case, said carrying case having a body in which said computer and printer are located and a cover movable to opened and closed position relative to the body, and said work station comprising:
    a printer tray attached to the body of said carrying case and supporting the printer;
    a computer tray spaced above said printer tray and supporting the computer when the cover of the carrying case is in the closed position; and
    positioning means by which said computer tray is moved laterally and rotationally relative to said printer tray to permit easy access to the computer and the printer when the cover of the carrying case is in the opened position, said positioning means including at least one arm, a first end of said arm pivotally connected to said printer tray and the opposite end of said arm pivotally connected to an end of said computer tray such that said computer tray is adapted to move laterally in generally parallel alignment with said printer tray and rotationally relative to said printer tray to form an angle therewith.

2. The portable work station recited in claim 1, wherein said computer tray and said printer tray are located at one side of the body of the carrying case, said work station further comprising a compartment located at the opposite side of said body within which to removably receive a peripheral device that is to be interfaced with the computer.

3. The portable work station recited in claim 1, further comprising a source of power and a main control panel having a plurality of manually operable switches located thereon, said switches being selectively operated to respectively connect the computer and/or the printer to said power source.

4. The portable work station recited in claim 3, further comprising a shroud extending across the body of said carrying case and having top and side walls, said main control panel located on the top wall and at one side of said shroud, such that said switches penetrate said top wall.

5. The portable work station recited in claim 4, further comprising a modem located within said shroud and below said main control panel and a circuit board supported on top of said modem, said modem and said switches of said main control panel being electrically connected to said circuit board.

6. The portable work station recited in claim 4, wherein said source of power is a battery, said battery located within said shroud at the side thereof opposite said main control panel, and further comprising means to support said battery from the top wall of said shroud.

7. The portable work station recited in claim 6, further comprising a cellular telephone located within said shroud below said battery and a data interface located within said shroud above said battery, said data interface, said battery and said cellular telephone being stacked in vertical alignment with one another.

8. The portable work station recited in claim 7, further comprising an antenna for said cellular telephone, said antenna located at the cover of said carrying case.

9. A portable work station including a carrying case and at least a computer and printer transported within the carrying case, said carrying case having a body in which said computer and printer are located and a cover movable to opened and closed positions relative to the body, said work station comprising:
    a printer tray attached to the body at one end of the carrying case and supporting the printer thereon;
    a computer tray spaced above and in vertical alignment with said printer tray and supporting the computer thereon;
    a battery located at the opposite end and at one side of the carrying case;
    a cellular telephone arranged in vertical alignment with said battery;
    a modem located at the side of the carrying case opposite said battery; and
    a main control panel having a plurality of manually operable switches and a circuit board at which said switches are electrically connected between said battery and each of said computer, printer, cellular telephone and modem, said circuit board arranged in vertical alignment with said modem, and said switches being selectively operated to respectively connect one or more of the computer, printer, cellular telephone and modem to said battery.

10. The portable work station recited in claim 9, further comprising means to move said computer tray relative to said printer tray to permit easy access to the computer and printer supported thereon.

11. The portable work station recited in claim 10, further comprising a shroud extending across the body of said carrying case to form a hollow compartment below said shroud, said battery and said telephone arranged in a first vertical stack within said compartment, and said modem and said circuit board arranged in a second vertical stack within said compartment.

12. A portable work station including a carrying case and at least a computer, a printer and one peripheral device transported within the carrying case, said carrying case having a body in which said computer, said printer and said peripheral device are located and a cover movable to opened and closed positions relative to the body, said work station comprising:

a computer tray and supporting the computer;

a printer tray and supporting the printer;

positioning means which position said printer tray and said computer tray one above the other such that one of said printer or computer trays is movable relative to the other one of said trays when the cover of the carrying case is in the opened position;

a shroud having a top wall extending across at least some of the body of said carrying case such that a hollow compartment is formed below said top wall and between said top wall and said body;

a control panel located on the top wall of said shroud and having a plurality of manually operable switches, said switches being selectively operated to control said computer, said printer and said peripheral device;

a circuit board located below the top wall of said shroud and within said compartment, the switches of said control panel electrically connected to said computer, said printer and said peripheral device by way of said circuit board; and said peripheral device located below the top wall of said shroud and within said compartment.

13. The portable work station recited in claim 12, wherein said circuit board is supported on top of said peripheral device below the top wall of said shroud and within said hollow compartment.

14. The portable work station recited in claim 12, wherein said peripheral device within said hollow compartment is a cellular phone.

15. The portable work station recited in claim 12, wherein said peripheral device within said hollow compartment is a modem.

16. The portable work station recited in claim 12, further comprising a battery to power each of said computer, said printer and said peripheral device, said battery located below the top wall of said shroud and within said hollow compartment.

17. The portable work station recited in claim 16, further comprising mechanical connecting means for connecting said battery within said hollow compartment to the top plate of said shroud.

* * * * *